UNITED STATES PATENT OFFICE.

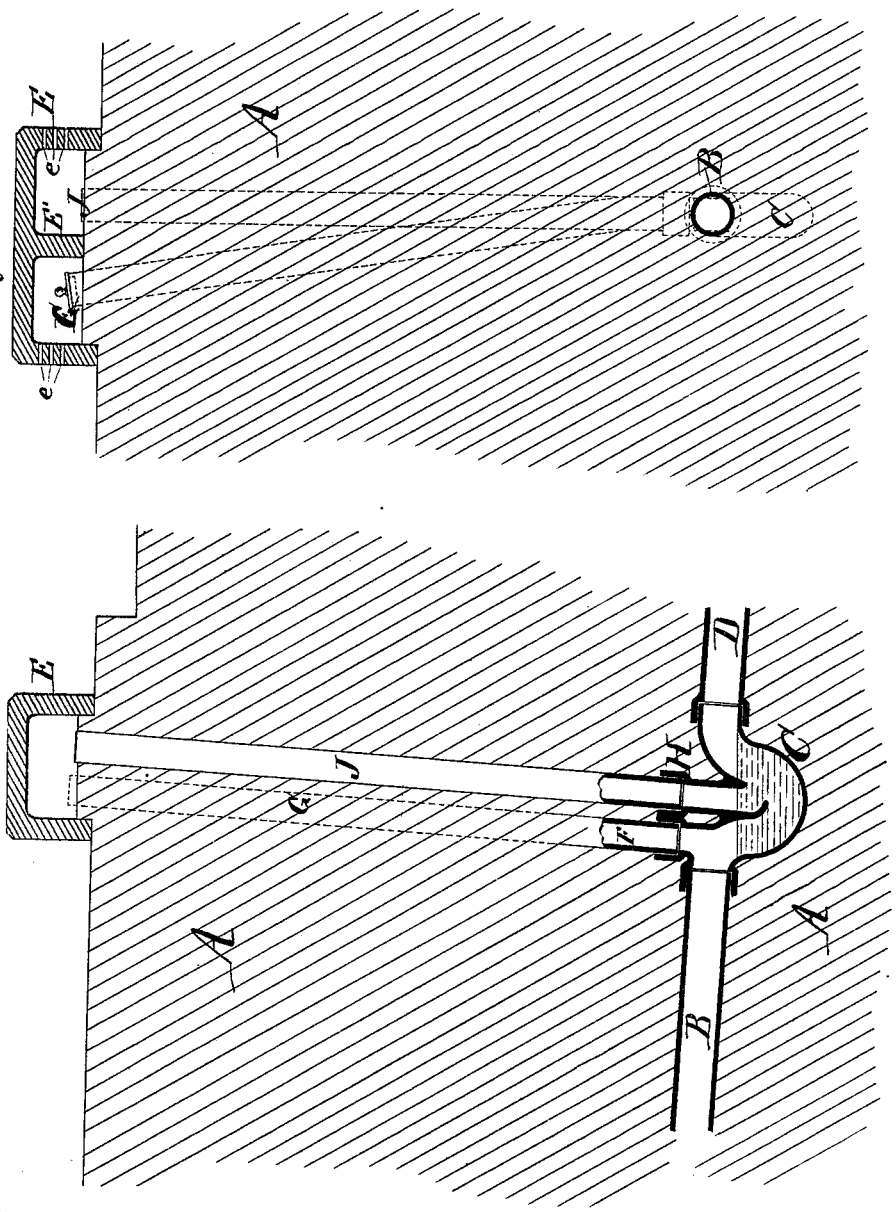

WILLIAM D. STEWART, OF NEW YORK, N. Y.

IMPROVEMENT IN MEANS FOR DISCHARGING SEWER-GAS FROM TRAPS.

Specification forming part of Letters Patent No. 195,853, dated October 2, 1877; application filed March 8, 1877.

*To all whom it may concern:*

Be it known that I, WILLIAM D. STEWART, of New York city, in the State of New York, have invented certain new and useful Improvements in Means for Discharging Sewer-Gas from Traps, of which the following is a specification:

I have, in a patent granted to me, dated June 27, 1876, No. 179,138, described a trap adapted to—in addition to its ordinary duties—perform the novel function of discharging the gas through an independent aperture whenever there is sufficient pressure in the sewer to force it.

The present invention relates to means for harmlessly disposing of the gas thus conducted away. This invention may be useful in connection with other traps, or even with sewer-connections where there is no trap; but I esteem it especially useful with a trap substantially of the character described in my previous patent aforesaid.

It is common to have in front of houses a large block of wood or stone to step upon to aid in mounting upon a horse, or in getting into or alighting from a carriage. Such block is variously known. I will term it a "mounting-block."

I form a mounting-block of pottery-ware. It is open at the bottom, being, in fact, an inverted earthenware vessel with a partition across the middle, and with several perforations at one or both ends. This vessel, being placed mouth downward in the proper position, performs the ordinary functions of a carriage-block or mounting-block. It may be caused to maintain its position firmly against lateral forces by being joggled into the sidewalk or by being otherwise anchored, but it is important that it be free to be lifted occasionally.

I place this mounting-block directly over the connection from the house to the sewer, and locate my trap described in the aforesaid patent of 1876 directly under it. I connect from the trap, by suitable pipes, to the space under and within the mounting-block. When a gale of wind blows in the mouth of the sewer, or the tide rises and closes the mouth, and then rises farther, when from any cause there is such pressure of the sewer-gas as tends to force the trap and cause the gas to pass into the several drain-connections within the house, the gas, instead of thus passing into the house-pipes, is discharged harmlessly into the mounting-block, and mingles with the open atmosphere through the perforations at the ends.

The accompanying drawings form a part of this specification, and represent what I consider the best means of carrying out the invention.

Figure 1 is a vertical section in the plane of the axis of the drain-pipe, and Fig. 2 is a vertical section at right angles thereto.

Similar letters of reference indicate like parts in all the figures.

A is the earth; B, the connection leading from the house outward toward the sewer, at a moderate inclination. C is the trap described in the patent of 1876, above referred to; and D is the continuation of the drain leading to the sewer. (Not represented.)

E is the earthenware mounting-block, formed with a tight partition, E', across the middle, and with perforations *e* at both ends.

There are two places of communication with the trap, besides the connection of the parts B and D. One of the top connections (marked F) is the one which is ordinarily closed by a removable cover, serving merely as a hand-hole through which to obtain access to the interior to clear it if ever it becomes clogged. Instead of a removable cover, I form a connection of earthen pipe, or other suitable pipe, (marked G,) leading up into one of the compartments in the mounting-block. There may be a cover for this within the mounting-block, if desired; but I prefer to leave it entirely open.

Whenever the sewer-trap is clogged the mounting-block should be lifted, and a long wire hook formed at its lower end may be reached down the tube G, and any obstruction in the sewer-trap may be thereby hooked into and drawn up.

The other connection, H, is that which is peculiar to my patent of 1876. It is below the ordinary level of the water in the trap, but only a little below.

When the pressure of the sewer-gas a little exceeds that of the atmosphere it will force the water-level down in that end of the trap without affecting the level in the other end. When this change of level has proceeded to a certain degree, the sewer-gas will force its way up through the opening H.

I extend a series of earthenware pipes, in short lengths, or of other pipe, upward from the connection, as indicated by J. This opens always freely into the remaining compartment in the mounting-block E. This passage is, therefore, always open, and except in the very rare case of an occasional temporary obstruction by snow or ice in winter, there is nothing to prevent the sewer-gas from escaping with absolute freedom through the perforations e in that end of the mounting-block.

It will be understood that with my trap it is only under extraordinary conditions that sewer-gas will be thus discharged; but there is always a free passage for its escape. Whenever any gas is discharged into the passage H it will escape with absolute freedom through the pipe J and the mounting-block. The latter is always at such a distance from the house that there is no probability of any appreciable quantity of the gas blowing into the house. The flow of the gas in the open air at rare intervals can hardly become injurious or offensive.

At the season when windows are open and a wind in a certain direction would blow the gas into the house, the liberal ventilation will prevent the infinitesimal quantity thus received from being injurious.

Where my trap of 1876 is not obtainable, or where, for any reason, it is dispensed with, the pipe J may be connected directly to the drain, so that the sewer-gas may escape more frequently or constantly in varying proportions through the mounting-block.

The opening being liberal, the traps in the house are relieved from any possible pressure to force them. The tight partition E renders it impossible for any gas which rises through the pipe J to flow down again through the pipe G, and thus get past the trap into the house-connection B; but fresh air can enter through the proper end of the mounting-block, and, descending through the pipe G, ventilate the house-connections, and this is likely to occur under ordinary conditions in tall city houses where there is a free opening from the top of the house-connections through the roof. The warmth due to the discharge of hot water, and in winter-time due to the house generally being warmer than the external air, will induce a constant gentle flow in that direction, and the entire system of pipes in the house will be kept reasonably ventilated.

I can, if desired, strengthen the earthenware mounting-block by making a longitudinal partition, and even by a number of partial partitions extending across, in addition to the main cross-partition E'.

I claim as my invention—

1. The mounting-block E, made of hollow ware, with a partition, E', and perforations e, adapted to serve as herein specified.

2. In combination with the trap C, house-connection B, and sewer-connection D, the passage H and pipe J, in combination with a hollow mounting-block, E, adapted to discharge gas therefrom harmlessly into the open air, as herein specified.

3. In combination, the trap C, having the two openings F and H, arranged as shown, and the two pipes G and J, leading up from them, and the covering-protection E, made easily removable, all substantially as herein specified.

In testimony whereof I have hereunto set my hand this 16th day of February, 1877, in the presence of two subscribing witnesses.

WILLIAM D. STEWART.

Witnesses:
 JOHN STEWART,
 CHAS. C. STETSON.